March 14, 1950          G. G. LANDIS          2,500,189

SATURABLE MAGNETIC SHUNT CONTROLLER

Filed Oct. 9, 1944          2 Sheets—Sheet 1

INVENTOR.
GEORGE G. LANDIS
BY
Oberlin + Limbach
ATTORNEYS

March 14, 1950 G. G. LANDIS 2,500,189
SATURABLE MAGNETIC SHUNT CONTROLLER
Filed Oct. 9, 1944 2 Sheets-Sheet 2

INVENTOR.
GEORGE G. LANDIS
BY
Oberlin + Limbach
ATTORNEYS

Patented Mar. 14, 1950

2,500,189

UNITED STATES PATENT OFFICE 2,500,189

SATURABLE MAGNETIC SHUNT CONTROLLER

George G. Landis, South Euclid, Ohio, assignor to The Lincoln Electric Company, Cleveland, Ohio, a corporation of Ohio Application October 9, 1944, Serial No. 557,765

3 Claims. (Cl. 171—119)

The present improvements, relating as indicated to arc welding methods and apparatus, have more particular regard to the provision of a more efficient construction of transformer or like apparatus, suitable for use in A. C. welding systems, as well as to the wiring plan or disposition of circuits in such a system.

In U. S. Letters Patent No. 2,299,329 issued to George G. Landis under date of October 20, 1942, there is disclosed a construction of close-coupled transformer wherein the primary and secondary coils are separated at a point within the contour of the main magnetic circuit and a variable magnetic bridge is provided in the area of separation of said windings. In the specific construction illustrated in said patent this bridge takes the form of a rotor of magnetic material suitably mounted within a hollow stator, and means are provided whereby said rotor may be set to occupy various positions about its axis and thus correspondingly vary the current flow in the secondary coil of the transformer, or in other words, the character of the current delivered to the secondary circuit, which in an arc welding system will of course be the main welding circuit.

One object of the present invention is to provide a transformer of the type just described but which will be considerably more efficient in operation.

A further object is to provide a construction for such transformer in which there need be incorporated no moving parts.

A still further object is to provide means whereby the current in the secondary or welding circuit may be automatically varied.

A further object is to provide a construction for such transformer which will facilitate assembly of the parts thereof and otherwise reduce the cost of manufacture.

A still further object is to provide means whereby the current in the secondary or welding circuit may be automatically varied to meet conditions encountered in the operation of arc welding with an A. C. current, and particularly to permit striking the arc with the short-circuit impedance set at an adjustable predetermined amount below normal and then automatically increasing such impedance to its normal value after the arc is established.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
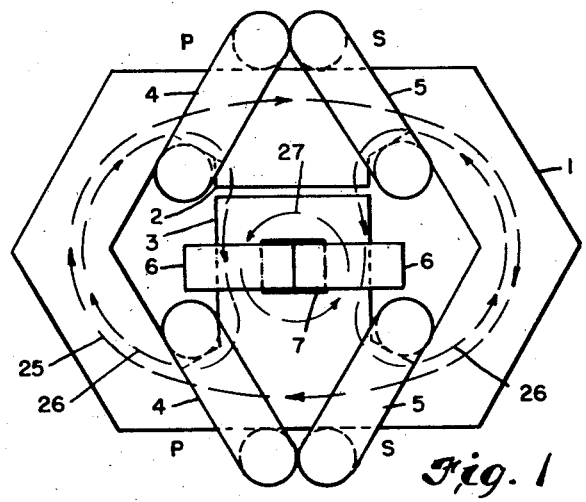
Fig. 1 is a top plan view more or less diagrammatic in character of one construction of transformer embodying the present improvements.

The illustrative construction of transformer shown in Fig. 1 comprises a stator 1 of the usual laminated type, such stator being of hollow form and having two inwardly directed projections 2 and 3 extending inwardly from its opposite sides.

Encircling each such side is a primary winding 4 and a secondary winding 5, the inner portions of the corresponding primary and secondary windings being held in spaced relation by the corresponding projection 2 or 3 as the case may be, while the outer portions of such windings lie in closely adjacent relation.

The one projection, viz. projection 3 as shown, is substantially longer than the other, the latter extending into the hollow interior of stator body 1 only far enough thus to retain in desired spaced relation the inner portions of the corresponding primary and secondary windings. Preferably only a narrow space or air gap is left between the juxtaposed ends of the two projections. Wound upon such longer projection 3 so as to lie transversely thereof are two coils 6, 6, such projection being provided centrally with an opening 7 to permit passage therethrough of the inwardly directed portions of the coils. The latter are connected in series and constitute what may be termed a control or surge coil, as will now be explained.

Figure 2:
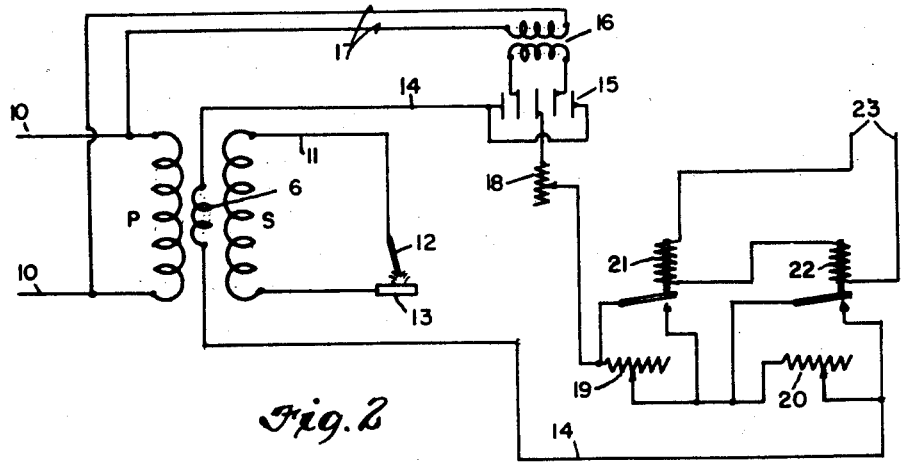
Fig. 2 is a wiring diagram showing such improved construction of transformer as included in an arc welding circuit.

As indicated in the diagram, Fig. 2, the primary coils are connected in series so as to constitute in effect a single primary, designated P, which is supplied with current from any suitable source through leads 10, 10. Similarly, the secondaries, inclusively designated S, are connected in series and form part of an arc welding circuit 11 in which is also included when in use a welding electrode 12 and the work-piece 13 upon which such electrode is designed to operate. The series-connected control or surge coils 6, shown for convenience as a single coil disposed between such primary winding P and secondary winding S, are designed to be supplied with direct current through leads 14, 14, such current being derived from any suitable source. However, as shown, such current is derived through a rectifier 15 from a small transformer 16 connected by leads 17 across the main primary supply leads 10. The current thus supplied to the control or surge coils 6 may be regulated in the first place by means of an adjustable rheostat 18 which will be manually set for output control, and in the second place by two similar adjustable rheostats 19 and 20, the inclusion of which in the circuit is controlled by time delay relays 21 and 22 respectively, such rheostats being connected in series in a circuit with leads 23 through which the proper current derived from any suitable source is supplied.

The general mode of operation of the transformer when included in a system such as illustrated in Fig. 2 will now be described. It will be noted that on Fig. 1 there are indicated by means of broken lines bearing direction arrows the main flux path 25 associated with the complete assemblage of primary and secondary coils as well as the leakage flux paths 26, 26 associated with the respective pairs of such primary and secondary coils. In addition, there is shown the path 27 of the saturating flux produced by flow of current through the control or surge coils 6.

It will thus be seen that by means of such last named coils the degree of saturation may be varied in the magnetic bridge, constituted by projections 2 and 3, which provides the leakage path between the primary and secondary of the transformer, taken as a whole.

Furthermore, by means of the several rheostats illustrated in the diagram Fig. 2, the reluctance of this leakage path may be adjusted without involving movement of any part within the transformer proper. For certain uses it may suffice to employ simply the manually adjustable rheostat 18. However, it will be ordinarily desirable to include the supplemental rheostats 19 and 20 with associated time delay relays which may be set so as to short out all or part of such supplemental rheostats during a predetermined brief starting period, whereupon the full flow of current permitted by the setting of rheostat 18 will be permitted through the coils 6. By providing, as shown, a plurality of relays which may be adjusted thus to short the corresponding rheostats in succession, such increase in flow of current may be effected in as many steps as desired.

By the means thus described a very simple and compact construction of transformer is provided whereby substantially the same results as are set forth in the aforesaid Patent No. 2,299,329 may be accomplished by using a wholly magnetic bridge instead of a rotatable or equivalent mechanical bridge to vary the current supplied by the transformer to an arc welding or other circuit. Furthermore, by means of the automatic controls provided, the regulation of such flow of current may be in part rendered automatic, this arrangement being particularly useful in providing a surge of excess current over that required in the normal welding operation at the time the arc is being struck.

Figure 3:
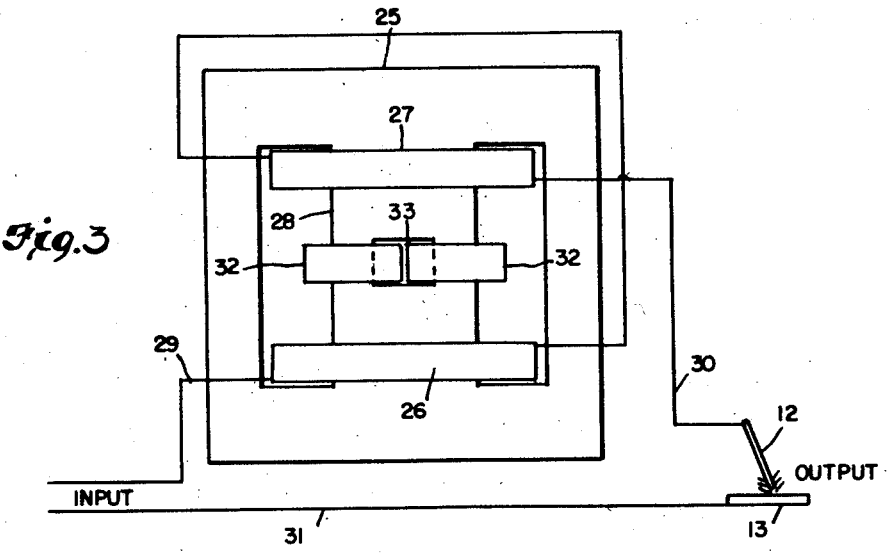
Figs. 3 and 4 are views, on the order of Fig. 1, but illustrating modified constructions.

The principle of the invention may be utilized in forms of electrical apparatus other than a transformer, one such modification being shown in Fig. 3, which illustrates a reactor designed for inclusion in an A. C. welding circuit. As thus shown, said reactor comprises a hollow stator body 25 constructed of laminated plates just as in the case of the stator 1 of the transformer illustrated in Fig. 1. However, in place of primary and secondary coils said stator is provided with two reactance coils 26 and 27 connected in series, said coils being wound about a transverse member 28 within the hollow interior of the stator which corresponds in location and takes the place of the two inwardly directed projections 2 and 3 of such previously described transformer.

In this connection it should be noted that in the case of the latter the air gap between such projections may be eliminated, i. e., such projections merged to form a continuous member bridging the space within the side walls of the stator. The term "projection" as used herein is accordingly to be understood as connoting either one or both of such projections as well as the latter thus merged to form a continuous bridge member.

As further shown in Fig. 3, leads 29 and 30 respectively connect the reactance coils 26 and 27 with any suitable source (not shown) of A. C. current and with the welding electrode 12, the work-piece 13 being similarly connected by another lead 31 with such source.

Wound upon bridge member 28 in the same manner as coils 6, 6 are wound upon projection 3 in the previously described transformer, are similarly arranged coils 32, 32, the inner portions of which pass through an opening 33 provided for the purpose, as before. Likewise, just as before, these coils 32, 32 are connected in series and constitute a control or surge coil that may be connected up in the welding system just as coils 6 are shown connected up in Fig. 2. Accordingly, the operative effect of these coils 32 will be to control the main flux path of the reactor through the bridge 28, just as said coils 6 serve to control the leakage path of the transformer windings in the previously described construction.

Figure 4:
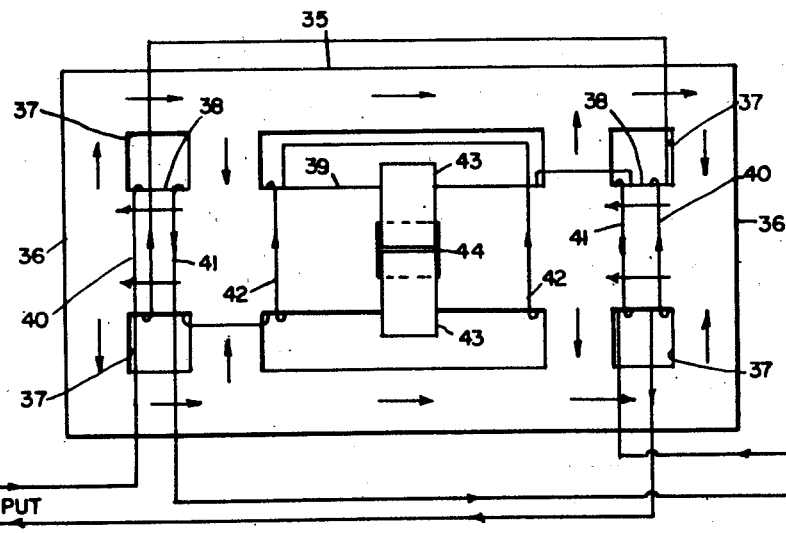

Likewise of course the principle of the invention may be utilized in transformers of different construction than the one illustrated in Fig. 1. Such a modification is illustrated in Fig. 4 where the stator body 35 of the transformer, while of hollow generally rectangular form, includes an extension 36 at each end, spaced from the corresponding end of the body proper and enclosing two openings 37, 37 which are formed by providing the ends of such main body with bridge-like extensions 38, 38. Aligned with the latter is a third bridge 39 which extends across the hollow interior of the main stator body, such bridge corresponding with the inwardly directed projections 2 and 3 of the first described construction.

Surrounding each such bridge-like extension 38 is a primary winding 40 and a secondary winding 41, each such pair of primary and secondary windings being connected in series just as before. In addition, a winding 42, which serves as a reactor, is connected with each such secondary, being placed upon the adjacent portion of bridge member 39. The latter also carries two coils 43, 43 mounted thereon in the same manner as coils 6, 6 are mounted upon projection 3 in the previously described transformer, the inner portions of such coils passing through opening 44 provided for the purpose, as before. Likewise, just as before, these coils 43, 43 are connected in series and together constitute a control or surge coil that may be connected the welding system just as coils 6 are shown connected up in Fig. 2.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a saturable magnetic shunt controller, the combination of primary and secondary windings separated at a point within the contour of the main magnetic circuit, a magnetic bridge in the leakage path between said windings, said bridge having a transverse air gap and one part thereof having an opening therethrough, and a coil surrounding such part of said magnetic bridge whereby the degree of saturation therein may be varied, said coil comprising two series-connected parts lying in the same plane with contiguous portions passing through such opening, such plane being angularly related to the planes of said primary and secondary windings.

2. In apparatus of the character described, the combination of a stator body of hollow form having a projection directed inwardly from each of two opposite sides of said stator, said projections together constituting a magnetic bridge interrupted by a transverse air gap, primary and secondary windings encircling said stator adjacent said respective projections, and a coil surrounding one of said projections, whereby the degree of saturation in said magnetic bridge may be varied, said projection having an opening therein and said coil comprising two series-connected parts lying in the same plane with contiguous portions passing through such opening.

3. In apparatus of the character described, the combination of a stator body of hollow form having a projection directed inwardly from each of two opposite sides of said stator, said projections together constituting a magnetic bridge interrupted by a transverse air gap and one of said projections being longer than the other, primary and secondary windings encircling said stator adjacent said respective projections, and a coil surrounding said larger projection, whereby the degree of saturation in said magnetic bridge may be varied, said projection having an opening therein and said coil comprising two series-connected parts lying in the same plane with contiguous portions passing through said opening.

GEORGE G. LANDIS.

REFERENCES CITED

The following references are of record in the file of this patent:

UNITED STATES PATENTS

| Number | Name | Date |
|---|---|---|
| 735,103 | Hull | Aug. 4, 1903 |
| 1,376,978 | Stoekle | May 3, 1921 |
| 2,036,264 | Forbes | Apr. 7, 1936 |
| 2,123,729 | Hunter | July 12, 1938 |
| 2,189,606 | King | Feb. 6, 1940 |
| 2,210,714 | Griscom | Aug. 6, 1940 |
| 2,224,645 | Eichberg | Dec. 10, 1940 |
| 2,228,731 | Pugh | Jan. 14, 1941 |
| 2,245,192 | Guel | June 10, 1941 |
| 2,305,153 | Fries | Dec. 15, 1942 |
| 2,306,578 | Wetzel | Dec. 29, 1942 |
| 2,346,997 | Priest | Apr. 18, 1944 |